United States Patent
Sandstrom et al.

(10) Patent No.: US 6,340,727 B1
(45) Date of Patent: Jan. 22, 2002

(54) RUBBER BLEND CONTAINING CYCLIZED POLYISOPRENE

(75) Inventors: Paul Harry Sandstrom, Tallmadge; Joseph Frank Geiser, Uniontown; Judy Chu, Hudson; David John Zanzig, Uniontown; Richard George Bauer, Kent, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/918,341

(22) Filed: Jul. 30, 2001

Related U.S. Application Data

(62) Division of application No. 09/824,610, filed on Apr. 2, 2001, now Pat. No. 6,303,693, which is a division of application No. 09/473,011, filed on Dec. 28, 1999, now Pat. No. 6,262,178.

(51) Int. Cl.$^7$ .......................... C08L 27/04; C08L 33/00; C08L 33/14; C08L 35/00; C08L 39/00
(52) U.S. Cl. ...................... 525/191; 525/212; 525/216; 525/232; 525/241
(58) Field of Search ................................ 525/191, 212, 525/216, 232, 241

(56) References Cited

U.S. PATENT DOCUMENTS 4,248,986 A * 2/1981 Lai et al. .................... 525/359

* cited by examiner

Primary Examiner—Nathan M. Nutter
(74) Attorney, Agent, or Firm—Alvin T. Rockhill

(57) ABSTRACT

This invention is based upon the discovery that cyclized polyisoprene polymers can be incorporated into tire tread compounds to improve traction, treadwear, and resistance to tear. It is further based upon the discovery that cyclized polyisoprene polymers can be blended with halobutyl rubber and/or natural rubber and can be utilized in tire innerliner formulations. The present invention more specifically discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of a sulfur cured rubber composition which is comprised of about 5 phr to about 50 phr of cyclized polyisoprene and about 50 phr to about 95 phr of at least one other rubbery polymer. The present invention further discloses a tire which is comprised of a generally toroidal-shaped carcass with an outer circumferential tread, two spaced beads, an innerliner, at least one ply extending from bead to bead and sidewalls extending radially from and connecting said tread to said beads, wherein said innerliner is comprised of a sulfur cured rubber composition which is comprised of about 5 phr to about 50 phr of cyclized polyisoprene and about 50 phr to about 95 phr of at least one other rubbery polymer selected from the group consisting of natural rubber and halobutyl rubber.

8 Claims, No Drawings

RUBBER BLEND CONTAINING CYCLIZED POLYISOPRENE

This is a Divisional of application Ser. No. 09/824,610, filed on Apr. 2, 2001, now U.S. Pat. No. 6,303,693, which is a Divisional of application Ser. No. 09/473,011, filed on Dec. 28, 1999, now issued as U.S. Pat. No. 6,262,178.

BACKGROUND OF THE INVENTION

Pneumatic passenger and truck tires have rubber treads. The tread rubber is generally compounded to provide relatively low rolling resistance with reasonable wear and traction characteristics. It is desirable for a tire to exhibit good traction characteristics on wet and dry pavements, and for the tire to provide good treadwear and low rolling resistance. In order to reduce the rolling resistance of a tire, rubbers having a high rebound can be utilized in making the tires' treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. To further improve traction characteristics, silica is also commonly included in the tread rubber as a filler. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene having multiple glass transition temperatures and having an excellent combination of properties for use in making tire treads which comprises terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further, the said bound butadiene structure contains about 30 to about 40 percent 1,2-vinyl units, the said bound isoprene structure contains about 10 to about 30 percent 3,4-units and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000 and wherein the rubber has an inhomogeneity which is within the range of about 0.5 to about 1.5.

Vinyl isoprene rubber (3,4-polyisoprene rubber) has heretofore been taught to be useful for various purposes such as, for example, as a blend with other rubbers in tire treads and in various industrial products, such as vibration dampers, belts and shoe soles. For instance see U.S. Pat. No. 4,383,085 and U.S. Pat. No. 4,756,353.

U.S. Pat. No. 5,087,668 and U.S. Pat. No. 5,300,577 disclose a sulfur cured rubber composition composed of, based on 100 parts by weight rubber (phr); (a) about 5 to about 35 parts by weight 3,4-polyisoprene rubber; (b) about 20 to about 60 parts by weight cis 1,4-polyisoprene rubber; and (c) about 10 to about 50 parts by weight of at least one other rubber selected from at least one of solution polymerization formed styrene/butadiene copolymer rubber having a styrene/butadiene ratio in the range of about 5/95 to about 30/70, emulsion polymerization formed styrene/butadiene copolymer rubber having a styrene/butadiene ratio in the range of about 10/90 to about 60/40, cis 1,4-polybutadiene rubber, isoprene/butadiene copolymer rubber having an isoprene/butadiene ratio in a range of about 30/70 to about 70/30, styrene/isoprene copolymer rubber having a styrene/ isoprene ratio in a range of about 10/90 to about 35/65, and styrene/isoprene/butadiene terpolymer rubber; wherein said 3,4-polyisoprene rubber, in its uncured state, is characterized by having a glass transition temperature (Tg) in the range of about −15° C. to about −20° C., a Mooney (ML1+4) value in the range of about 70 to about 90, and, further, a polymer structure containing about 40 to about 70, preferably about 50 to about 60, 3,4-vinyl isoprene units, about 30 to about 50 percent 1,4-cis and trans units and about 2 to about 10 percent 1,2-isoprene units with the total of its 3,4 and 1,2 units being in the range of about 56 to about 63 percent.

SUMMARY OF THE INVENTION

This invention is based upon the discovery that cyclized polyisoprene polymers can be incorporated into tire tread compounds to improve traction, treadwear, and resistance to tear. It is further based upon the discovery that blends of cyclized polyisoprene polymers with halobutyl rubber and/or natural rubber can be utilized as tire innerliner formulations.

The present invention specifically discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of a sulfur cured rubber composition which is comprised of about 5 phr to about 50 phr of cyclized polyisoprene and about 50 phr to about 95 phr of at least one other rubbery polymer.

The present invention further reveals a tire which is comprised of a generally toroidal-shaped carcass with an outer circumferential tread, two spaced beads, an innerliner, at least one ply extending from bead to bead and sidewalls extending radially from and connecting said tread to said beads, wherein said innerliner is comprised of a sulfur cured rubber composition which is comprised of about 5 phr to about 50 phr of cyclized polyisoprene and about 50 phr to about 95 phr of at least one other rubbery polymer selected from the group consisting of natural rubber and halobutyl rubber.

The present invention also discloses a sulfur cured rubber composition which is comprised of (a) about 5 to about 50 parts by weight cyclized polyisoprene; (b) about 10 to about 70 parts by weight cis 1,4-polyisoprene rubber; and (c) about 5 to about 60 parts by weight of at least one other rubber selected from the group consisting of solution polymerization formed styrene/butadiene copolymer rubber having a styrene/butadiene ratio in the range of about 5/95 to about 30/70, emulsion polymerization formed styrene/butadiene copolymer rubber having a styrene/butadiene ratio in the range of about 10/90 to about 60/40, cis 1,4-polybutadiene rubber, isoprene/butadiene copolymer rubber having an isoprene/butadiene ratio in a range of about 30/70 to about 70/30, styrene/isoprene copolymer rubber having a styrene/isoprene ratio in a range of about 10/90 to about 35/65, and styrene/isoprene/butadiene terpolymer rubber.

DETAILED DESCRIPTION OF THE INVENTION

The cyclized polyisoprene polymers used in the practice of this invention can be synthesized by utilizing the procedure described in U.S. Pat. No. 4,248,986. The teachings of U.S. Pat. No. 4,248,989 are incorporated herein by reference in their entirety. In any case, the cyclization of isoprene containing polymers can be catalyzed by strong acids, such as sulfuric acid, Lewis acids, such as $SnCl_4$, $TiCl_4$, $BF_3$, or $FeCl_3$, organic acids, such as p-toluene sulfonic acid, or a combination of such acids. Dodecyl benzenesulfonic acid is an excellent choice as the catalyst for cyclizing isoprene containing polymers because it is completely soluble in hexane. Solubility is, of course, important for the direct reaction with isoprene containing polymers in cement form. The cyclized isoprene containing polymer can be polyisoprene or any other polymer that contains at least about 40 weight percent isoprene. For instance, the cyclized isoprene containing polymer can be a copolymer of isoprene and additional conjugated diolefin monomers, such as 1,3-butadiene. The cyclized isoprene containing polymer can also be cyclized 3,4-polyisoprene.

The cyclized isoprene containing polymer will typically have a level of cyclization that is within the range of 25 percent to about 90 percent. In other words, about 25 percent to about 90 percent of the repeat units in the polymer will be cyclized. More typically, the cyclized isoprene containing polymer will have a level of cyclization that is within the range of about 35 percent to about 70 percent. The cyclized polyisoprene will preferably have a level of cyclization that is within the range of 40 percent to 60 percent. The cyclized polyisoprene will more preferably have a level of cyclization that is within the range of 45 percent to 55 percent.

It has been discovered that cyclized polyisoprene polymers can be utilized in tire tread compounds and tire innerliner compounds. These cyclized polyisoprene containing compounds can be used in manufacturing tires for both automobiles and trucks. Such tires will normally include a generally toroidal-shaped carcass with an outer circumferential tread, two spaced beads, an innerliner, at least one ply extending from bead to bead and sidewalls extending radially from and connecting said tread to said beads. The tread of such tires is, of course, adapted to be ground-contacting. The treads of this invention are comprised of a sulfur cured rubber composition which is comprised of about 5 phr to about 50 phr of cyclized polyisoprene and about 50 phr to about 95 phr of at least one other rubbery polymer.

The tire treads of this invention are preferably comprised of (a) about 5 to about 50 parts by weight cyclized polyisoprene; (b) about 10 to about 70 parts by weight cis 1,4-polyisoprene rubber; and (c) about 5 to about 60 parts by weight of at least one other rubber selected from the group consisting of solution polymerization formed styrene/butadiene copolymer rubber having a styrene/butadiene ratio in the range of about 5/95 to about 30/70, emulsion polymerization formed styrene/butadiene copolymer rubber having a styrene/butadiene ratio in the range of about 10/90 to about 60/40, cis 1,4-polybutadiene rubber, isoprene/butadiene copolymer rubber having an isoprene/butadiene ratio in a range of about 30/70 to about 70/30, styrene/isoprene copolymer rubber having a styrene/isoprene ratio in a range of about 10/90 to about 35/65, and styrene/isoprene/butadiene terpolymer rubber.

Such tire tread compounds will preferably contain about 5 phr (parts per 100 parts by weight of rubber) to about 35 phr of the cyclized polyisoprene, about 20 phr to about 60 phr of cis-1,4-polyisoprene, and about 10 phr to about 50 phr of one or more additional rubbery polymers. Such tire tread compounds will most preferably contain about 5 phr to about 20 phr of the cyclized polyisoprene, about 40 phr to about 60 phr of cis-1,4-polyisoprene, and about 30 phr to about 40 phr of one or more additional rubbery polymers. Such treads provide tires with significantly improved traction, treadwear, and resistance to tear.

The rubbery elastomer employed in the tread compound can be any rubber or blend of rubbers that can be used in manufacturing tire treads. For instance, the rubbery elastomer can be natural rubber, emulsion styrene-butadiene rubber, solution styrene-butadiene rubber, styrene-isoprene-butadiene rubber or a mixture thereof Such blends can also contain 3,4-polyisoprene, trans-1,4-polybutadiene or cis-1,4-polybutadiene rubber. In cases where 3,4-polyisoprene, trans-1,4-polybutadiene or cis-1,4-polybutadiene rubber are included in the tread compound, they will generally be employed at a level of less than about 40 phr. For instance, the 3,4-polyisoprene, trans-1,4-polybutadiene or the cis-1,4-polybutadiene can be employed in an amount which is within the range of about 5 phr to about 35 phr. The 3,4-polyisoprene that can be utilized will normally have a 3,4-microstructure content of 55 percent to 80 percent as determined by NMR spectroscopy. The 3,4-polyisoprene will, accordingly, have a cis-1,4-microstructure content which is within the range of 20 percent to 45 percent. The 3,4-polyisoprene will also normally have a glass transition temperature from −25° C. to 10° C. as determined by differential scanning calorimetry at a heating rate of 10° C./minute. The cis-1,4-polybutadiene that can be employed in the tread compound will typically have a cis-1,4-microstructure content of at least about 96 percent as determined by NMR spectroscopy.

In one embodiment of this invention, the rubbery elastomer in the tread compound can be styrene-butadiene rubber. For instance, the tread compound can be made using only styrene-butadiene rubber as the rubbery elastomer. However, the rubbery elastomer can also be a blend of styrene-butadiene rubber with natural rubber, 3,4-polyisoprene, cis-1,4-polybutadiene, trans-1,4-polybutadiene or styrene-isoprene-butadiene rubber. In cases where the styrene-butadiene rubber is blended with another rubbery polymer, the other rubbery polymer will normally be added in an amount that is within the range of about 5 phr to about 40 phr.

The tread compound will also contain at least one filler, such as carbon black and/or silica. Clays and/or talc can be included in the filler to reduce cost. The filler will normally be present in an amount that is within the range of about 35 phr to about 130 phr. In high performance passenger tire applications, the filler will normally be present in an amount that is within the range of about 35 phr to about 70 phr. In race tire applications, the filler will normally be present in an amount that is within the range of about 70 phr to about 130 phr. The tread compound can also contain one or more resins; such as, coumarone-indene resin. The resin will normally be added in an amount that is within the range of about 5 phr to about 60 phr in race tire applications. In passenger tire applications, the resin will typically be added in an amount that is within the range of 0 phr to about 20 phr. In passenger tire applications, it is typically preferred for the tread compound not to contain any resin.

The tire tread compounds of this invention can be made utilizing conventional ingredients and standard techniques. For instance, the cyclized polyisoprene polymer containing compound will typically also include sulfur, accelerators, waxes, scorch inhibiting agents and processing aids. In most cases, the tread rubber formulation will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. The tire tread compounds of this invention will also normally contain from 0.5 to 10 phr of zinc oxide with 1 to 5 phr being preferred. These blends can optionally contain from 0 to 30 phr of tackifier resins, 0 to 10 phr of reinforcing resins, 1 to 10 phr of fatty acids, 0 to 2.5 phr of peptizers and 0 to 1 phr of scorch inhibiting agents.

The tire innerliner compounds of this invention are comprised of a blend of cyclized polyisoprene with a halobutyl rubber and/or natural rubber. Such blends will typically contain about 10 phr to about 50 phr of the cyclized polyisoprene and about 50 phr to about 90 phr of the halobutyl rubber and/or natural rubber It is normally preferred for such blends to contain from about 25 phr to about 50 phr of the cyclized polyisoprene and about 50 phr to about 75 phr of the halobutyl rubber and/or natural rubber.

The tread rubber compounds and the tire innerliner compounds of this invention can be used in tire treads in conjunction with ordinary tire manufacturing techniques. In other words, tires can be built utilizing standard techniques. After the tire has been built, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.).

The practice of this invention is further illustrated by reference to the following examples that are intended to be representative rather than restrictive of the scope of the invention. Unless otherwise indicated, all parts and percentages are by weight.

EXAMPLES

A solution containing 54.0 grams of 1,4-polyisoprene dissolved in 651.0 grams of hexane (1000 ml of a 7.6 weight percent cement) was added to a 2.0 liter Pyrex resin kettle equipped with a stainless steel mechanical stirrer, thermometer, reflux condenser, and nitrogen inlet. The solution was then stirred while it was heated to 60° C. in an oil bath. Then, 1.0 grams (3.0 weight percent of the dry polymer) of dodecylbenzene sulfonic acid was added and the mixture was stirred at 60° C. for 8 hours. Aliquots were removed every hour for 'HNMR and DSC (Differential Scanning Calorimetry) analyses. The amount of cyclization attained and the glass transition temperature (Tg) of the cyclized polyisoprene samples made is shown in Table I.

TABLE I

| Reaction Time | % Cyclization | Tg (° C.) |
|---|---|---|
| 1 hour | 26.0 | −57.6 |
| 2 hours | 40.5 | −48.7 |
| 3 hours | 45.1 | −39.4 |
| 4 hours | 53.6 | −29.6 |
| 5 hours | 58.9 | −22.9 |
| 6 hours | 61.1 | −18.7 |
| 7 hours | 67.2 | −9.9 |
| 8 hours | 69.0 | −3.6 |

The percentage of cyclization was determined by 'HNMR and the glass transition temperatures were determined by DSC.

After the full 8 hours of reaction time 0.81 grams of triethylamine was added to neutralize the acid and thus to short-stop the cyclization reaction. The cement was then coagulated with alcohol containing 0.54 grams (1 pph) of dissolved antioxidant. The solvents were decanted and the remaining solid polymer was then dried in a vacuum oven at 40° C.

A cyclized polyisoprene having a glass transition temperature of −20° C. and a cyclized polyisoprene having a glass transition temperature of −30° C. were then evaluated in a passenger tire tread compound. These passenger tire compounds were also compared to a control compound made using 15 phr of 3,4-polyisoprene.

The passenger tire compounds were made by preparing a first non-productive compound by mixing 15 phr of the 3,4-polyisoprene or the cyclized polyisoprene, 55 phr of natural rubber, 30 phr of a solution styrene-butadiene rubber having a bound styrene content of 12% and a Mooney viscosity of 90, 40 phr of carbon black, 8 phr of processing aids/waxes, 2 phr of fatty acids, 3 phr zinc oxide, and 3 phr of antioxidants. The first non-productive compound was mixed for 4 minutes in a Banbury mixer after which time a drop temperature of 160° C. was reached. A second non-productive compound was then made by further mixing 10 phr of HiSil 210 silica and 2 phr of a 50%/50% mixture of carbon black and Si69 silica coupling agent into the first non-productive compound. The second non-productive compound was mixed for 2 minutes in the Banbury mixer and was dropped at a temperature of 150° C. A productive compound was then made by further mixing 1.1 phr of accelerators and 1.5 phr of sulfur into the second non-productive compound. The productive compound was mixed in the Banbury mixer for 2 minutes and was dropped at a temperature of 110° C.

The productive compounds were cured and evaluated to determine physical properties. The results of this evaluation are shown in Table II.

TABLE II

| Compound made with 15 phr of: | 3, 4-PI | Cyclized PI (Tg of −20°) | Cyclized PI (Tg of −30°) |
|---|---|---|---|
| Ts1, min. | 5.6 | 5.1 | 4.8 |
| T25, min. | 6.7 | 5.8 | 5.4 |
| T90, min. | 11.9 | 9.9 | 9.3 |
| Smin, dNm | 2.4 | 2.3 | 2.3 |
| Delta S, dNm | 12.9 | 11.7 | 11.7 |
| 100% Modulus | 1.9 Mpa | 1.8 Mpa | 1.8 Mpa |
| 200% Modulus | 4.8 Mpa | 4.4 Mpa | 4.3 Mpa |
| 300% Modulus | 9.1 Mpa | 8.7 Mpa | 8.5 Mpa |
| Tensile | 16.3 Mpa | 17.7 Mpa | 18.3 Mpa |
| Elongation | 498% | 535% | 552% |
| Hardness @RT | 56 | 56 | 56 |
| Hardness @ 100° C. | 53 | 52 | 52 |
| DIN Abrasion | 127 | 111 | 122 |
| Strebler | 66N | 92N | 85N |
| Tan δ @ 0° C. | 0.21 | 0.25 | 0.20 |
| E' @0° C. | 16.3 Mpa | 15.8 Mpa | 15.3 Mpa |
| Tan δ @60° C. | 0.08 | 0.10 | 0.10 |
| E' @60° C. | 7.93 Mpa | 6.35 Mpa | 7.20 Mpa |

The ts1, T25, T90, Smin, and Delta S reported in Table II were determined with a rheometer at 150° C. The elongation values reported in Table II are percentages to break. Din Abrasion is reported as volume loss. Thus, the lower Din Abrasion values are better than higher Din Abrasion values. The Strebler Adhesion reported was measured as an average load and was determined at a temperature of 95° C. The tan δ values and the E' values reported were determined with an autovibron at 11 Hz.

As can be seen from Table II, substituting the cyclized polyisoprene for the 3,4-polyisoprene resulted in improved tensile strength and elongation to break. These properties are indicative of improved durability for tire treads. The lower DIN abrasion observed using the cyclized polyisoprene is also indicative of improved tire treadwear. The tan δ values observed at 0° C. and 60° C. predict similar tire traction and rolling resistance characteristics. Thus, abrasion and tear resistance can be improved without sacrificing rolling resistance or traction characteristics by substituting cyclized polyisoprene for 3,4-polyisoprene in tire tread compounds.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur cured rubber composition which is comprised of (a) about 5 to about 50 parts by weight cyclized polyisoprene; (b) about 10 to about 70 parts by weight cis 1,4-polyisoprene rubber; and (c) about 5 to about 60 parts by weight of at least one other rubber selected from the group consisting of solution polymerization formed styrene/butadiene copolymer rubber having a styrene/butadiene ratio in the range of about 5/95 to about 30/70, emulsion polymerization formed styrene/butadiene copolymer rubber having a styrene/butadiene ratio in the range of about 10/90 to about 60/40, cis 1,4-polybutadiene rubber, isoprene/butadiene copolymer rubber having an isoprene/butadiene ratio in a range of about 30/70 to about 70/30, styrene/isoprene copolymer rubber having a styrene/isoprene ratio in a range of about 10/90 to about 3 5/65, and styrene/isoprene/butadiene terpolymer rubber.

2. A sulfur cured rubber composition as specified in claim 1 wherein said sulfur cured rubber composition is in the form of a tire tread.

3. A sulfur cured rubber composition as specified in claim 1 wherein the cyclized polyisoprene is present at a level which is within the range of about 5 phr to about 35 phr, wherein the cis-1,4-polyisoprene is present at a level which is within the range of about 20 phr to about 60 phr, and wherein the other rubber is present at a level which is within the range of about 10 phr to about 50 phr.

4. A sulfur cured rubber composition as specified in claim 1 wherein the cyclized polyisoprene is present at a level which is within the range of about 5 phr to about 20 phr, wherein the cis-1,4-polyisoprene is present at a level which is within the range of about 40 phr to about 60 phr, and wherein the other rubber is present at a level which is within the range of about 30 phr to about 40 phr.

5. A sulfur cured rubber composition as specified in claim 1 wherein said cyclized polyisoprene has a level of cyclization that is within the range of 25 percent to about 90 percent.

6. A sulfur cured rubber composition as specified in claim 1 wherein said cyclized polyisoprene has a level of cyclization that is within the range of about 35 percent to about 70 percent.

7. A sulfur cured rubber composition as specified in claim 1 wherein said cyclized polyisoprene has a level of cyclization that is within the range of 40 percent to about 60 percent.

8. A sulfur cured rubber composition as specified in claim 1 wherein said cyclized polyisoprene has a level of cyclization that is within the range of 45 percent to 55 percent.

* * * * *